United States Patent
Nakajima

(10) Patent No.: US 9,517,687 B2
(45) Date of Patent: Dec. 13, 2016

(54) BATTERY UNIT MOUNTING STRUCTURE

(71) Applicant: TOYOTA JIDOSHA KABUSHIKI KAISHA, Toyota-shi, Aichi-ken (JP)

(72) Inventor: Jun Nakajima, Toyoto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/052,014

(22) Filed: Feb. 24, 2016

(65) Prior Publication Data

US 2016/0257187 A1    Sep. 8, 2016

(30) Foreign Application Priority Data

Mar. 6, 2015    (JP) .................. 2015-045046

(51) Int. Cl.
*B60R 16/04*    (2006.01)
*B60K 1/04*    (2006.01)
*B62D 21/15*    (2006.01)

(52) U.S. Cl.
CPC ............... *B60K 1/04* (2013.01); *B62D 21/157* (2013.01); *B60K 2001/0416* (2013.01)

(58) Field of Classification Search
CPC .............. B60K 1/04; B60K 2001/0405; B60K 2001/0433
See application file for complete search history.

(56) References Cited

U.S. PATENT DOCUMENTS 8,534,398 B2 *    9/2013  van der Stappen ...... B60K 1/04
                                                    180/65.1
2009/0021052 A1    1/2009  Kato 2009/0166116 A1    7/2009  Kiya et al.
2011/0011654 A1    1/2011  Kubota et al.
2012/0175177 A1    7/2012  Lee et al.
(Continued)

FOREIGN PATENT DOCUMENTS

DE    112011104518 T5    10/2013
DE    102012019922 A1    4/2014
(Continued)

OTHER PUBLICATIONS

Jun. 29, 2016 Search Report issued in European Patent Application No. 16156973.6.

*Primary Examiner* — John Walters
*Assistant Examiner* — James Triggs
(74) *Attorney, Agent, or Firm* — Oliff PLC

(57) ABSTRACT

A battery unit mounting structure includes a pair of right and left vehicle body frame members extending in a vehicle front-rear direction, a pair of right and left side members extending in the vehicle front-rear direction, a battery unit disposed between the right and left side members, and a reinforcement. The right and left vehicle body frame members are disposed respectively at right and left outer side portions of a vehicle body in a vehicle-width direction. The right and left side members are connected respectively to inner sides of the right and left vehicle body frame members in the vehicle-width direction. The reinforcement is disposed on a bottom or top surface of the battery unit, and disposed at a position at which the reinforcement overlaps with the battery unit in a plan view. The reinforcement extending in the vehicle-width direction is longer than the battery unit in the vehicle-width direction.

11 Claims, 7 Drawing Sheets

(56) References Cited

U.S. PATENT DOCUMENTS

| | | |
|---|---|---|
| 2012/0183828 A1 | 7/2012 | van den Akker |
| 2013/0161106 A1 | 6/2013 | Iwai et al. |
| 2014/0021744 A1 | 1/2014 | Imamura et al. |
| 2014/0338997 A1 | 11/2014 | Okada et al. |

FOREIGN PATENT DOCUMENTS

| | | |
|---|---|---|
| EP | 1992513 A1 | 11/2008 |
| JP | 2007-253933 A | 10/2007 |
| JP | 2009-023383 A | 2/2009 |
| JP | 2009-184577 A | 8/2009 |
| JP | 2012-101663 A | 5/2012 |
| JP | 5434860 B2 | 3/2014 |
| JP | 2014-226972 A | 12/2014 |
| JP | 2015-003715 A | 1/2015 |
| WO | 2012/018202 A2 | 2/2012 |
| WO | 2014/188259 A1 | 11/2014 |

\* cited by examiner

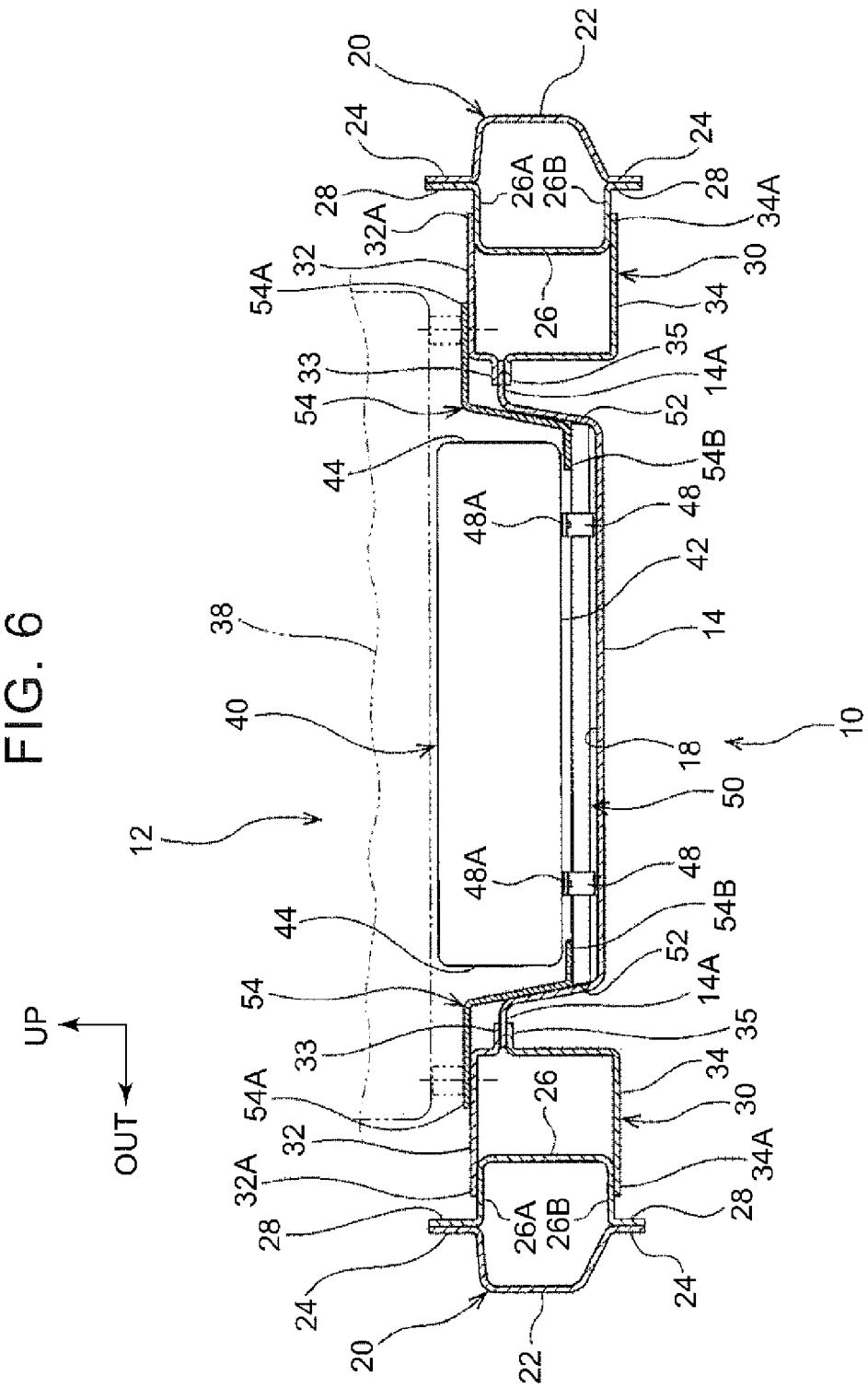

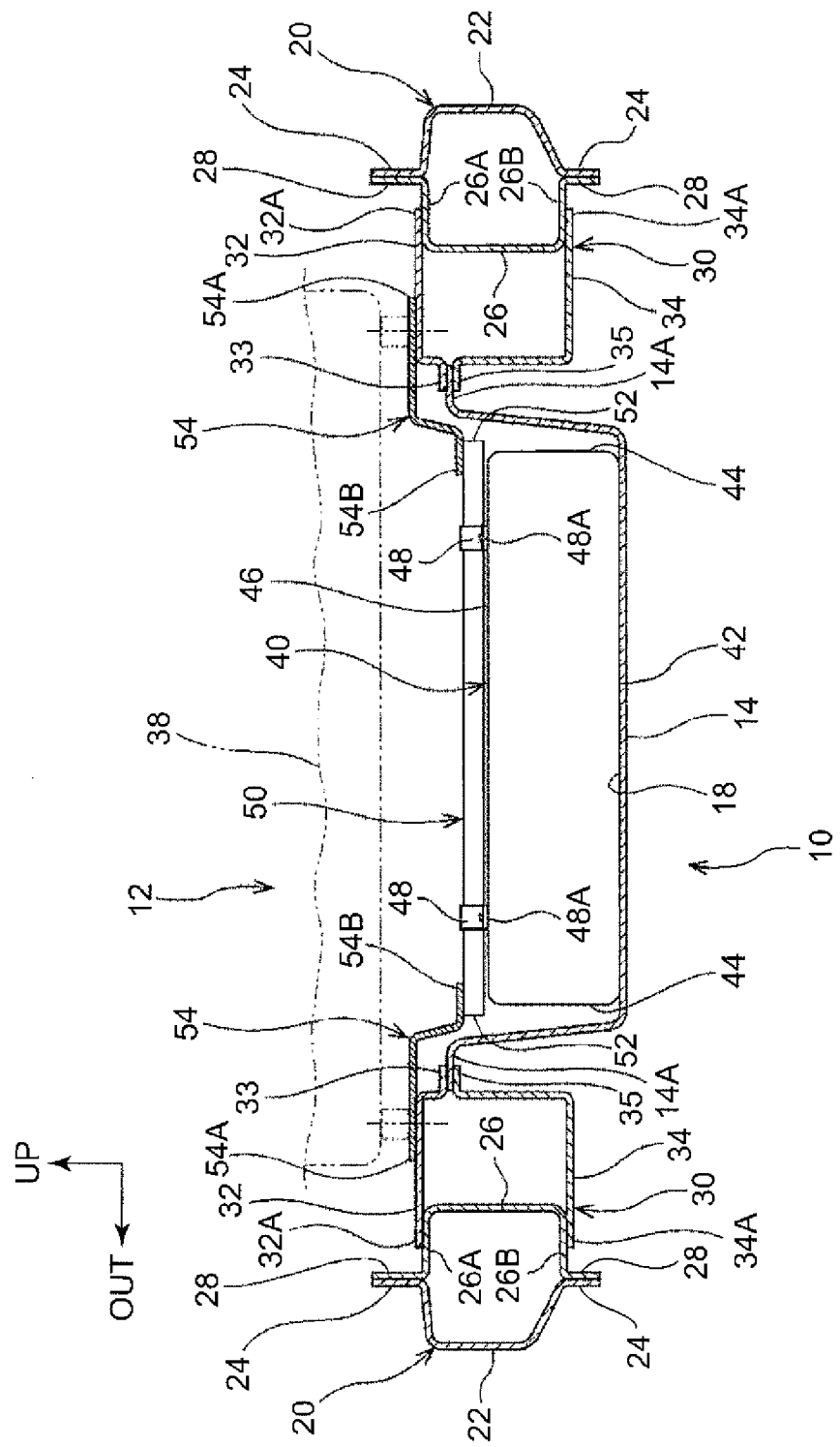

BATTERY UNIT MOUNTING STRUCTURE

INCORPORATION BY REFERENCE

The disclosure of Japanese Patent Application No, 2015-045046 filed on Mar. 6, 2015 including the specification, drawings and abstract is incorporated herein by reference in its entirety.

BACKGROUND

1. Technical Field

The disclosure relates to battery unit mounting structures.

2. Description of Related Art

Structures for mounting storage battery packs in vehicles are known (for example, see Japanese Patent Application Publication No. 2007-253933 (JP 2007-253933 A)). Such structures can reduce damage of the storage battery packs when an impact is externally applied to the vehicles or the storage battery packs in the vehicle front-rear direction or vehicle-width direction.

However, there is still a need for improvement in structures for effective reductions in damage of battery units, such as storage battery packs, due to loads externally applied in the vehicle-width direction.

SUMMARY

The disclosed embodiments provide a battery unit mounting structure that effectively reduces damage of a battery unit due to a load externally applied in the vehicle-width direction.

According to one aspect, a battery unit mounting structure includes a pair of right and left vehicle body frame members, a pair of right and left side members, a battery unit, and a reinforcement. The right and left vehicle body frame members extend in a vehicle front-rear direction, and are disposed respectively at right and left outer side portions of a vehicle body in a vehicle-width direction. The right and left side members extend in the vehicle front-rear direction, and are connected respectively to inner sides of the right and left vehicle body frame members in the vehicle-width direction. The battery unit is disposed between the right and left side members. The reinforcement is disposed on a bottom surface or a top surface of the battery unit. The reinforcement is disposed at a position at which the reinforcement overlaps with the battery unit in a plan view. The reinforcement has a width in the vehicle-width direction that is longer than a width of the battery unit in the vehicle-width direction.

According to the above aspect, a load externally applied to one of the vehicle body frame members in the vehicle-width direction is transmitted from the one vehicle body frame member to the reinforcement and then transmitted from the reinforcement to the other vehicle body frame member. As a result, the load that could be applied to the battery unit is partially or completely absorbed, and damage of the battery unit is effectively reduced.

In addition, when a load is externally applied to one of the vehicle body frame members in the vehicle-width direction, at least part of the energy of the load is absorbed by one of the side members, resulting in a reduction in a load transmitted through the reinforcement to the other side member and the other vehicle body frame member. As a result, the load that could be applied to the battery unit is partially or completely absorbed more reliably, and damage of the battery unit is reduced more effectively.

In the above aspect, the reinforcement may be disposed at a position at which the reinforcement overlaps with the vehicle body frame members in a vehicle-height direction.

According to this aspect, a load externally applied to one of the vehicle body frame members in the vehicle-width direction is efficiently transmitted from the one vehicle body frame member to the reinforcement and then transmitted from the reinforcement to the other vehicle body frame member. As a result, the load that could be applied to the battery unit is partially or completely absorbed more reliably, and damage of the battery unit is reduced more effectively.

In the above aspect, the reinforcement may be fixed to the battery unit.

According to this aspect, when a load externally applied to one of the vehicle body frame members in the vehicle-width direction is transmitted from the one vehicle body frame member to the reinforcement, the battery unit moves toward the other vehicle body frame member together with the reinforcement. As a result, the load that could be applied to the battery unit is partially or completely absorbed more reliably, and damage of the battery unit is reduced more effectively.

In the above aspect, the battery unit mounting structure may further include a pair of right and left gussets, each of the gussets having an inner end portion in the vehicle-width direction connected to a corresponding one of outer end portions of the reinforcement in the vehicle-width direction, and each of the gussets having an outer end portion in the vehicle-width direction connected to a corresponding one of the side members.

According to this aspect, a load externally applied to one of the vehicle body frame members in the vehicle-width direction is promptly transmitted through one of the gussets to the reinforcement. The load transmitted to the reinforcement is then promptly transmitted through the other gusset to the side member on the other side. This effectively reduces damage of the battery unit.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is a partially sectional front view of the battery unit mounting structure in accordance with the second embodiment; and FIG. 7 is a partially sectional front view of a battery unit mounting structure in accordance with a third embodiment.

DETAILED DESCRIPTION OF EMBODIMENTS

Figure 2:
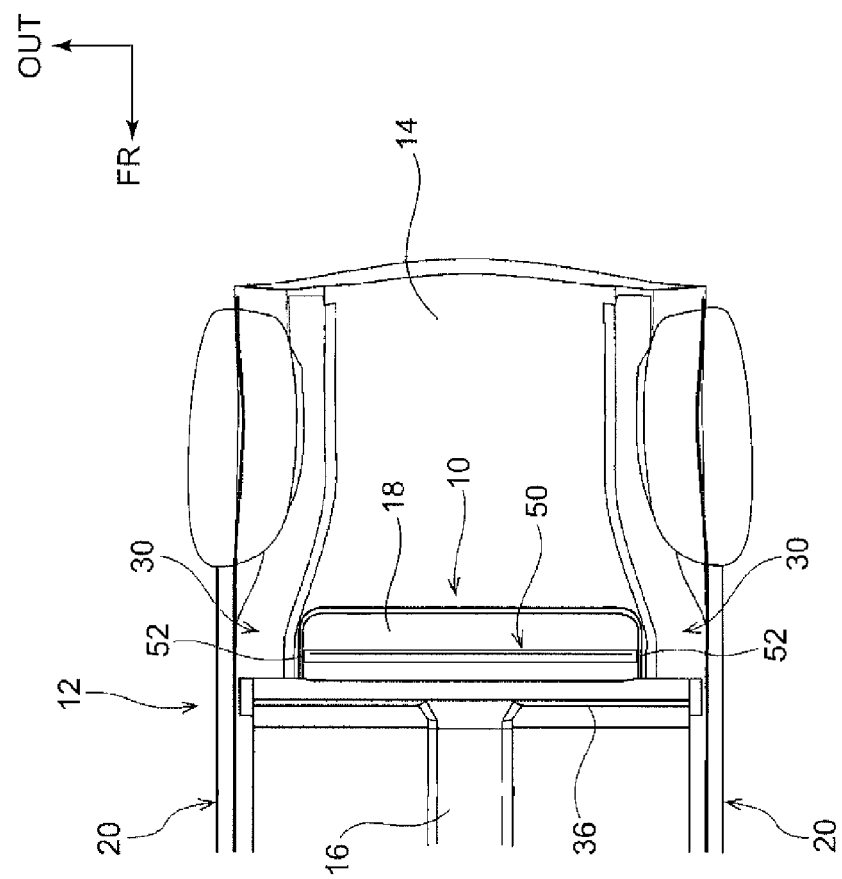
FIG. 2 is a plan view of the battery unit mounting structure in accordance with the first embodiment.
Figure 5:
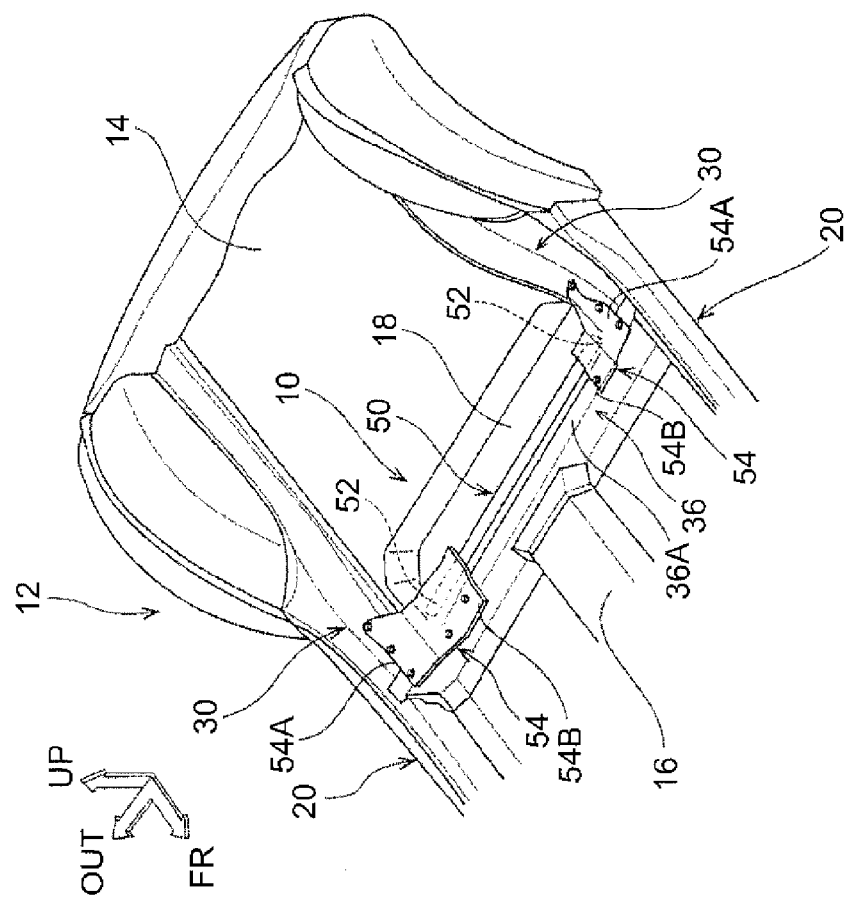
FIG. 5 is a perspective view of a battery unit mounting structure in accordance with a second embodiment.

Example embodiments will now be described in detail with reference to the attached drawings. For convenience of the description, an arrow UP indicates the upward direction with respect to a vehicle body, an arrow FR indicates the forward direction with respect to the vehicle body, and an arrow OUT indicates the outward direction along the vehicle-width direction, in the drawings. In the following description, the terms "upper and lower", "front and rear", and "right and left" indicate "upper and lower" in the vehicle-height direction, "front and rear" in the vehicle front-rear direction, and "right and left" in the vehicle lateral direction (vehicle-width direction), respectively, unless otherwise specified. In FIGS. 2 and 5, illustration of a battery unit 40, which will be described later, is omitted.

Figure 1:
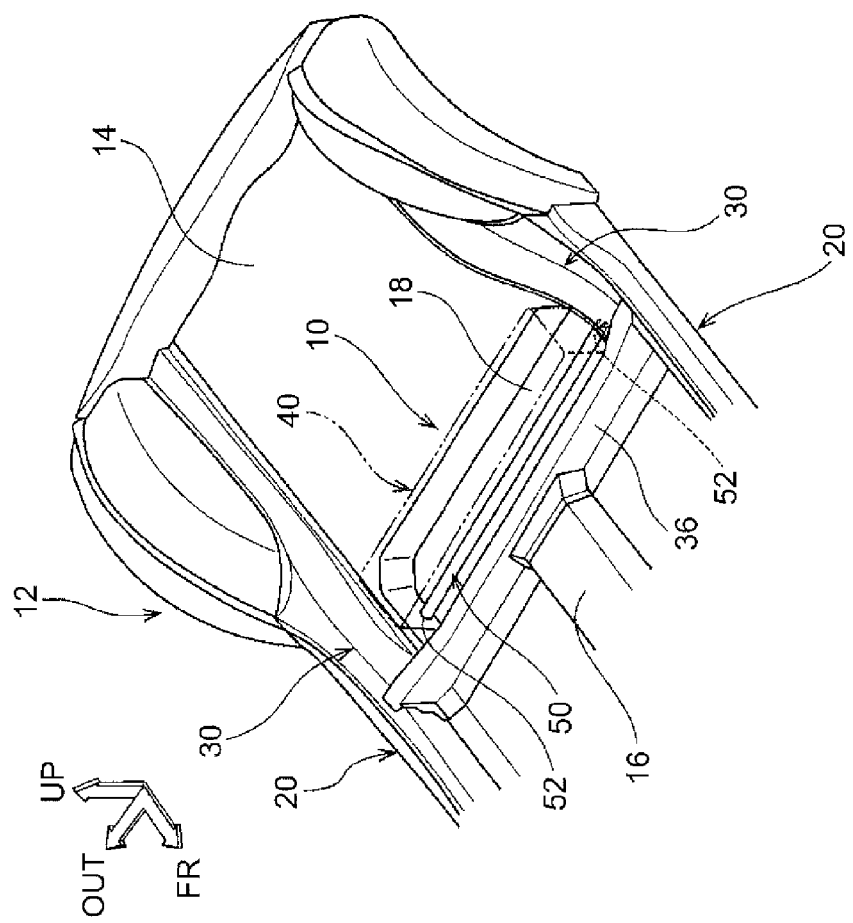
FIG. 1 is a perspective view of a battery unit mounting structure in accordance with a first embodiment.
Figure 3:
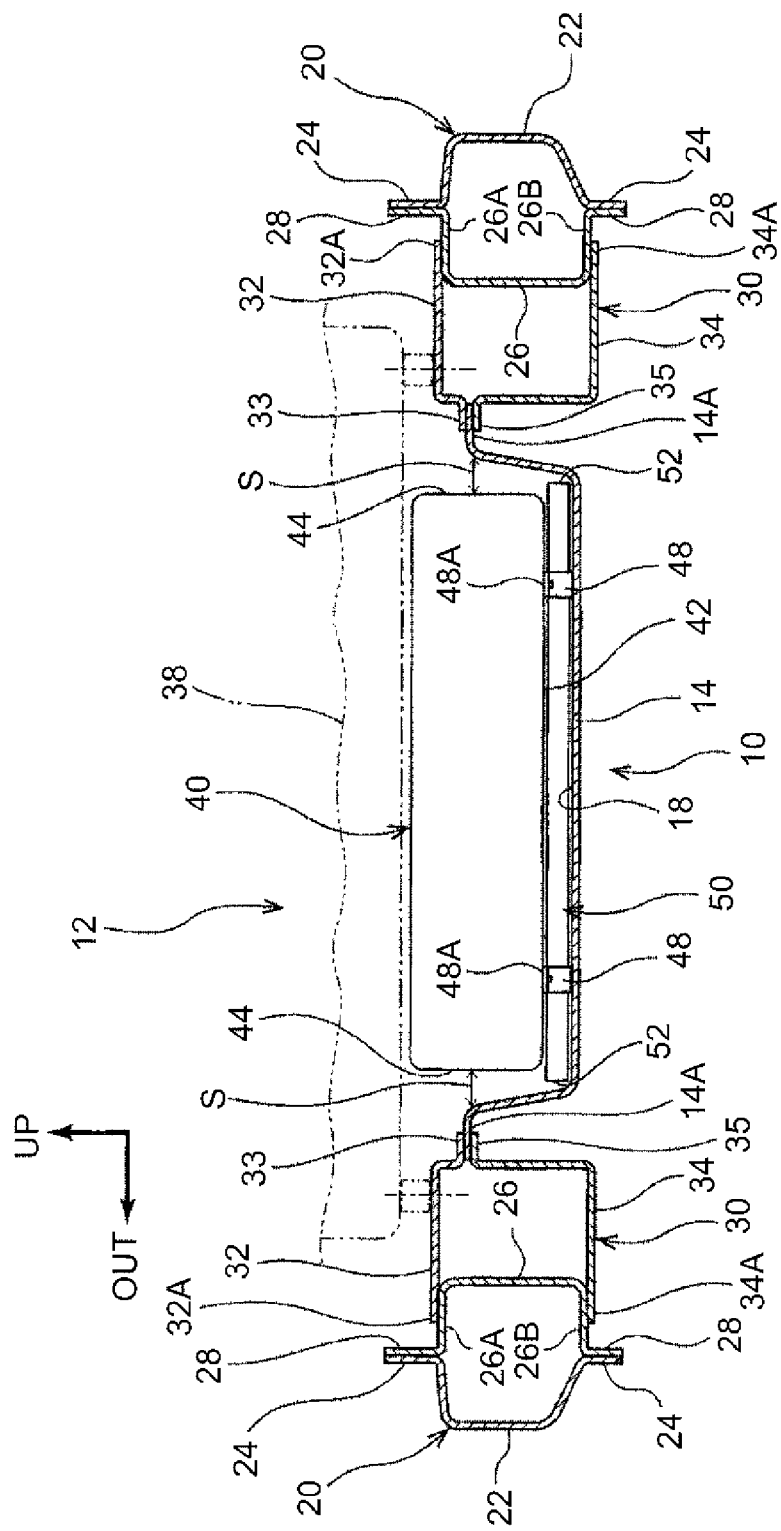
FIG. 3 is a partially sectional front view of the battery unit mounting structure in accordance with the first embodiment.

Hereinafter, a first embodiment will be described. A battery unit mounting structure 10 in accordance with the first embodiment will now be described. As illustrated in FIGS. 1 and 2, a vehicle 12, such as a hybrid vehicle or an electric vehicle, provided with the battery unit mounting structure 10 includes a metal floor panel 14 that constitutes a floor of a vehicle cabin. As illustrated in FIG. 3, the floor panel 14 has outer portions in the vehicle-width direction. The outer portions of the floor panel 14 bend upward in the vehicle-height direction and then bend outward in the vehicle-width direction. Outer end portions of the floor panel 14 in the vehicle-width direction that bend outward in the vehicle-width direction define flanges 14A.

As illustrated in FIGS. 1 to 3, metal rockers 20 are disposed outside the floor panel 14 (flanges 14A) in the vehicle-width direction. The rockers 20 may function as a pair of right and left vehicle body frame members extending in the vehicle front-rear direction. The rockers 20 each include an outer panel 22 having a substantially hat-shaped cross section and an inner panel 26 having a substantially hat-shaped cross section. Flanges 24 of the outer panel 22 and flanges 28 of the inner panel 26 are joined to each other by, for example, welding, to form a closed space in a cross-sectional view.

Rear side members 30 having a substantially C-shaped cross section are connected to the inner sides (inner panels 26) of the rockers 20 in the vehicle-width direction. The rear side members 30 may function as a pair of side members extending in the vehicle front-rear direction. The rear side members 30 each include an upper panel 32 and a lower panel 34. An outer end portion 32A of the upper panel 32 in the vehicle-width direction is joined to a top wall 26A of the inner panel 26 by, for example, welding. An outer end portion 34A of the lower panel 34 in the vehicle-width direction is joined to a bottom wall 26B of the inner panel 26 by, for example, welding.

The upper panel 32 has an integrated flange 33, at its inner end portion in the vehicle-width direction. The lower panel 34 has an integrated flange 35, at its upper portion. The flange 35 is an inner end portion of the lower panel 34 in the vehicle-width direction. The flange 33 and the flange 35 are joined to each other with the flange 14A of the floor panel 14 disposed therebetween. With this configuration, a closed space is defined by the rear side member 30 and the inner panel 26 of the rocker 20 in a sectional view, and the flange 14A of the floor panel 14 is fixed to the rocker 20 via the rear side member 30.

As illustrated in FIGS. 1 and 2, the floor panel 14 has a tunnel portion 16 that is disposed at the center in the vehicle-width direction. The tunnel portion 16 protrudes upward in the vehicle-height direction, and extends in the vehicle front-rear direction. A rear cross member 36 having a substantially hat-shaped cross section is joined to the top surface of the floor panel 14, at a position forward of the rear side members 30 in the vehicle front-rear direction. The rear cross member 36 extends in the vehicle-width direction and connects the right and left rockers 20 (inner panels 26) to each other.

The battery unit 40 is disposed between the right and left rear side members 30 (and the rockers 20) and above the top surface of the floor panel 14. The battery unit 40 is disposed at a position rearward of the rear cross member 36 in the vehicle front-rear direction. The battery unit 40, which is called a storage battery pack, a battery pack, or a hybrid (HV) battery, and has a substantially rectangular parallelepiped shape having a lengthwise direction that coincides with the vehicle-width direction.

The floor panel 14 has a recess 18 on its top surface, at a position rearward of the rear cross member 36 in the vehicle front-rear direction. The recess 18 is shaped so as to substantially conform to the lower portion of the battery unit 40. The lower portion of the battery unit 40 is fitted into the recess 18 of the floor panel 14 so as to prevent, for example, misalignment of the battery unit 40 from the given position. A rear seat 38 (see FIG. 3) supported by the rear side members 30 is disposed above the battery unit 40 in the vehicle-height direction.

As illustrated in FIGS. 1 to 3, a rod 50 is fitted to a bottom surface 42 of the battery unit 40. The rod 50 may function as a reinforcement extending in the vehicle-width direction. The rod 50 is a circular pipe. The rod 50 is connected and fixed, with several, for example, two brackets 48, at a position at which the rod 50 overlaps with the battery unit 40 in a plan view (bottom view). For example, the rod 50 is connected and fixed at or near the center of the bottom surface 42 in the vehicle front-rear direction.

The brackets 48 each have a substantially U-shaped cross section. The rod 50 is fixed to the bottom surface 42 of the battery unit 40 by fitting and joining the brackets 48 to the outer peripheral surface of the rod 50 from below the rod 50 with a predetermined pressure and by fastening the flanges 48A extending in the vehicle front-rear direction, to the bottom surface 42 of the battery unit 40 with bolts. This prevents the rod 50 from moving in the vehicle-width direction relatively to the battery unit 40.

The rod 50 fixed to the bottom surface 42 of the battery unit 40 and disposed in the recess 18 of the floor panel 14 is located at a position at which the rod 50 overlaps with the rear side members 30 and the rockers 20 (except the flanges 24 and 28) in the vehicle-height direction when viewed from the front, rear, and sides of the vehicle body. That is, the rod 50 is disposed at a position at which the rod 50 is located neither above nor below the rear side members 30 and the rockers 20 (except the flanges 24 and 28) in the vehicle-height direction when viewed from the front, rear, and sides of the vehicle body.

The rod 50 is longer than the battery unit 40 in the vehicle-width direction. That is, the rod 50 has right and left outer end portions 52 that protrude by the same length outward in the vehicle-width direction from side surfaces 44 (outer ends in the vehicle-width direction) of the battery unit 40. This configuration forms right and left spaces S of the same size between the side surfaces 44 of the battery unit 40 and the outer portions of the floor panel 14 in the vehicle-width direction that bend upward in the vehicle-height direction.

The rod 50 illustrated in the drawings is a circular pipe. Alternatively, the rod 50 may have any shape, for example, the rod 50 may be a square pipe. The number of the brackets 48 used to join the rod 50 to the bottom surface 42 of the battery unit 40 may be any number other than two as illustrated in the drawings. Alternatively, the rod 50 may be directly joined and fixed to the bottom surface 42 of the battery unit 40 by, for example, welding.

Figure 4:
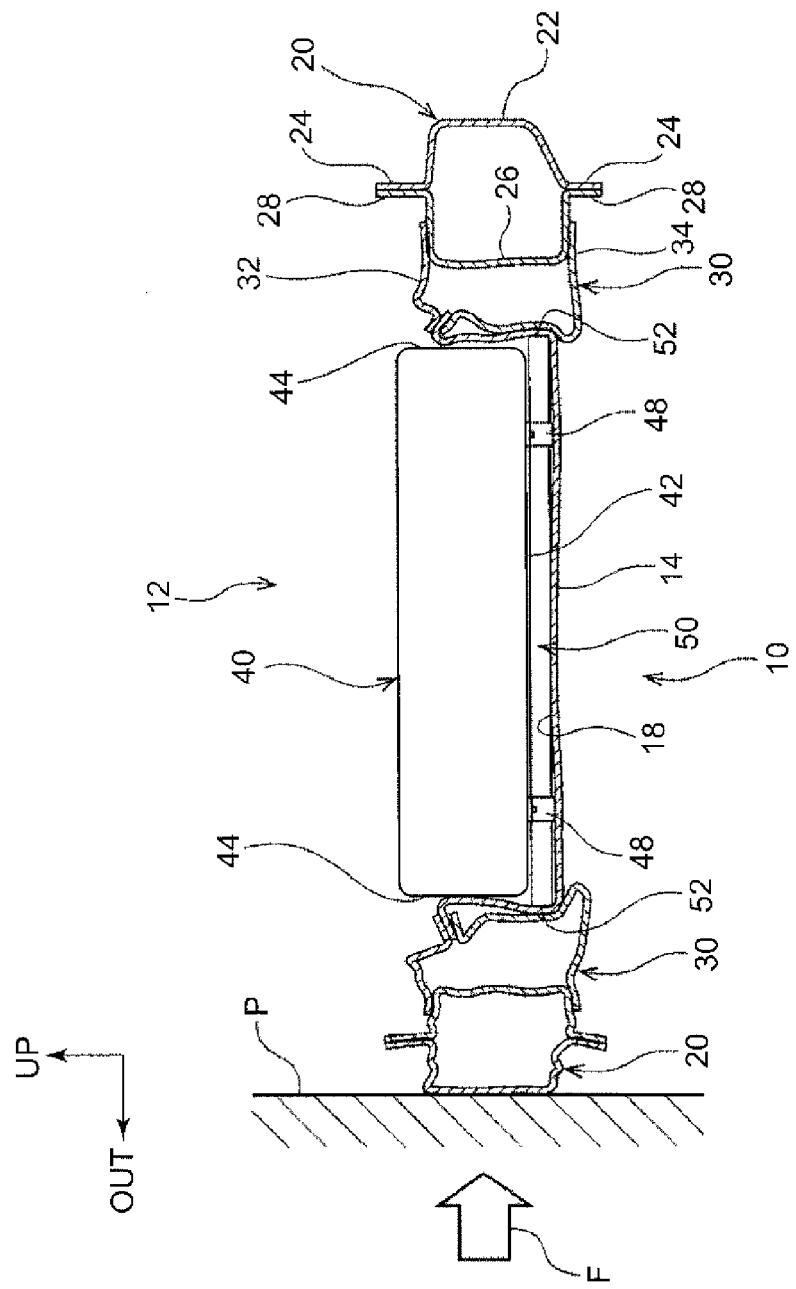
FIG. 4 is a partially sectional front view of the battery unit mounting structure in accordance with the first embodiment in the event of a lateral collision.

Advantageous effects of the battery unit mounting structure 10 having the above-described configuration in the first embodiment will now be described. With reference to FIG. 4, description will be provided on advantageous effects in the event of a lateral collision of the vehicle 12 with, for example, a columnar or cylindrical metal pole (obstacle) P extending vertically.

As illustrated in FIG. 4, when the vehicle 12 collides with the pole P laterally, a significantly high collision load F headed inward in the vehicle-width direction is applied to the rocker 20 and the rear side member 30 on the collision side. The collision load F externally applied to the rocker 20 and the rear side member 30 in the vehicle-width direction plastically deforms and moves the rocker 20 and the rear side member 30 inward in the vehicle-width direction. Thus, part of the energy of the applied collision load F is absorbed and the remainder is transmitted to the rod 50 fixed to the battery unit 40.

Since the rod 50 extends so as to be longer than the battery unit 40 in the vehicle-width direction (the rod 50 is longer than the battery unit 40 in the vehicle-width direction), a collision load is transmitted to the outer end portion 52 of the rod 50 in the vehicle-width direction before being transmitted to the side surface 44 of the battery unit 40 in the event of a lateral collision of the vehicle 12. The rod 50 has high rigidity and strength in its axial direction due to its circular pipe shape.

Thus, the lateral collision load externally transmitted to the rod 50 in the vehicle-width direction is received by the rod 50 in its axial direction, and the rod 50 then moves in its axial direction (vehicle-width direction) and crushes, from the inside in the vehicle-width direction, the rear side member 30 located on the opposite side of the rod 50 from the collision side (hereinafter, simply referred to as "the opposite side"). Thus, the collision load applied to the rocker 20 and the rear side member 30 on the collision side is transmitted to the rear side member 30 and the rocker 20 on the opposite side and thus dispersed (energy is absorbed). As a result, the collision load that could be applied to the battery unit 40 is partially or completely absorbed.

That is, damage of the battery unit 40 due to the collision load externally applied in the vehicle-width direction can be effectively reduced (the battery unit 40 can be protected). Since the rod 50 is fixed to the battery unit 40, movement of the rod 50 away from the collision side (in the vehicle-width direction) also moves the battery unit 40 away from the collision side. As a result, the collision load that could be applied to the battery unit 40 is partially or completely absorbed more reliably.

Since the rod 50 is disposed at a position at which the rod 50 overlaps with the rear side members 30 and the rockers 20 in the vehicle-height direction, the collision load applied to the rocker 20 and the rear side member 30 on the collision side is readily transmitted to the rear side member 30 and the rocker 20 on the opposite side. That is, this configuration can efficiently transmit the collision load applied to the rocker 20 and the rear side member 30 on the collision side to the rear side member 30 and the rocker 20 on the opposite side, thereby efficiently dispersing the collision load. This makes it possible to more effectively reduce damage of the battery unit 40 due to the collision load externally applied in the vehicle-width direction.

The battery unit mounting structure 10 in this embodiment can be easily formed just by fixing the rod 50 to the bottom surface 42 of the battery unit 40. Further, the battery unit mounting structure 10 has a lighter weight than, for example, a battery unit mounting structure including a rear cross member 36 with an increased strength for reduction of damage of the battery unit 40. This results in an improvement in fuel efficiency performance of the vehicle 12. On disposition of the battery unit 40 on the floor panel 14, the battery unit mounting structure 10 only requires the recess 18 to be shaped to have a space for the rod 50, which does not limit the layout of the components on the top surface of the floor panel 14.

Hereinafter, a second embodiment will be described. A battery unit mounting structure 10 in accordance with the second embodiment will now be described. Components equivalent to those in the first embodiment have the same reference characters, and detailed description (including common advantageous effects) thereof may be omitted.

As illustrated in FIGS. 5 and 6, the battery unit mounting structure 10 in the second embodiment includes a pair of right and left gussets 54 connecting upper panels 32 of right and left rear side members 30 and outer end portions 52 of a rod 50 in the vehicle-width direction, which is the only difference from the first embodiment.

Each gusset 54 is bent to have a substantially Z-shaped cross section. The gusset 54 has an outer end portion 54A in the vehicle-width direction, at its upper portion. The outer end portion 54A is fastened to the top surface of the upper panel 32 of the rear side member 30, for example, with bolts. The gusset 54 has an inner end portion 54B in the vehicle-width direction, at its lower portion. The inner end portion 54B is joined at its rear side portion in the vehicle front-rear direction, to the top surface of the outer end portion 52 of the rod 50 in the vehicle-width direction by, for example, welding.

When the vehicle 12 collides with the pole P laterally as illustrated in FIG. 4, a collision load is transmitted from the rear side member 30 on the collision side through the gusset 54 to the rod 50 promptly (in the early stage of the collision). The collision load transmitted to the rod 50 is then promptly transmitted through the gusset 54 on the opposite side of the rod 50 from the collision side, to the rear side member 30 on the opposite side, and thus dispersed That is, provision of the gussets 54 makes it possible to promptly transmit the collision load applied to the rocker 20 and the rear side member 30 on the collision side, to the rear side member 30 and the rocker 20 on the opposite side, thereby dispersing the collision load, resulting in an improvement in energy absorption efficiency. As a result, the collision load that could be applied to the battery unit 40 is partially or completely absorbed more reliably, and the damage of the battery unit 40 due to the collision load externally applied in the vehicle-width direction is more effectively reduced.

As illustrated in FIG. 5, the inner end portion 54B of each gusset 54 is fastened at its front side portion in the vehicle front-rear direction, to a top wall 36A of a rear cross member 36 with bolts. Thus, the collision load is transmitted from the rear side member 30 on the collision side through the gusset 54 to the rear cross member 36 promptly (in the early stage of the collision) and thus dispersed. The gussets 54 hold right and left end portions of the bottom surface 42 of the battery unit 40 in the vehicle-width direction.

Hereinafter, a third embodiment will be described. A battery unit mounting structure 10 in accordance with the third embodiment will now be described. Components equivalent to those in the first and second embodiments have As illustrated in FIG. 7, the battery unit mounting structure 10 in the third embodiment includes a rod 50 connected and fixed to a top surface 46 of a battery unit 40, with several, for example, two brackets 48, at a position at which the rod 50 overlaps with the battery unit 40, for example, at or near the center of the top surface 46 in the vehicle front-rear direction, in a plan view, which is the only difference from the second embodiment.

When the vehicle 12 collides with the pole P laterally as illustrated in FIG. 4, a collision load applied to the rocker 20 and the rear side member 30 on the collision side is transmitted to the rear side member 30 and the rocker 20 on the opposite side promptly (in the early stage of the collision) and thus dispersed, as in the second embodiment, resulting in an improvement in energy absorption efficiency.

As a result, the collision load that could be applied to the battery unit 40 is partially or completely absorbed more reliably, and the damage of the battery unit 40 due to the lateral collision load external applied in the vehicle-width direction is more effectively reduced. In the third embodiment, a rear seat 38 can be disposed lower than that in the first and second embodiments.

The battery unit mounting structures 10 in accordance with the embodiments have been described with reference to the attached drawings but should not be limited to those illustrated in the drawings. The design may be appropriately modified. For example, the number of the rod 50 may be any number other than one as illustrated in the drawings. Several, for example, two rods 50 may be arranged adjacent to each other in the vehicle front-rear direction.

The rod 50 may be attached to the battery unit 40 so as to be movable in the vehicle-width direction, instead of being fixed to the bottom surface 42 or the top surface 46 of the battery unit 40. The right and left spaces S defined between the side surfaces 44 of the battery unit 40 and the outer portions of the floor panel 14 in the vehicle-width direction that bend upward in the vehicle-height direction may have different sizes.

In the first embodiment, which does not include the pair of right and left gussets 54, a connector (not shown) may connect the substantial lengthwise center of the rod 50 with the substantial lengthwise center of the rear cross member 36 to transmit a collision load transmitted to the rod 50 to the rear cross member 36, thereby dispersing the collision load.

The embodiments may exclude the rear side members 30 on the inner sides of the rockers 20 in the vehicle-width direction. In this case, the configuration only requires the flanges 14A of the floor panel 14 to be joined to the top walls 26A of the inner panels 26 of the rockers 20, or the outer end portions 54A of the gussets 54 in the vehicle-width direction to be connected to the top walls 26A of the inner panels 26 of the rockers 20.

It should be noted that the rear side members 30 provided on the inner sides of the rockers 20 in the vehicle-width direction have the advantage in that the rear side members 30 absorb energy of a collision load externally applied in the vehicle-width direction. The battery unit mounting structure 10 in the embodiments achieves the same advantageous effects in the event of, for example, a lateral collision of the vehicle 12 with a planar obstacle at high speed as in the event of a lateral collision of the vehicle 12 with an obstacle that may cause local deformation, such as the pole P.

What is claimed is:

1. A battery unit mounting structure comprising:
   a pair of right and left vehicle rockers extending in a vehicle front-rear direction, the right and left vehicle rockers being disposed respectively at right and left outer side portions of a vehicle body in a vehicle-width direction;
   a pair of right and left side members extending in the vehicle front-rear direction, the right and left side members being connected respectively to inner sides of the right and left vehicle rockers in the vehicle-width direction;
   a battery unit disposed between the right and left side members; and
   a reinforcement disposed on a bottom surface or a top surface of the battery unit, the reinforcement being disposed at a position at which the reinforcement overlaps with the battery unit in a plan view, and the reinforcement having a width in the vehicle-width direction that is longer than a width of the battery unit in the vehicle-width direction, wherein
   each of the right and left vehicle rockers is hollow and forms a closed space when viewed in cross-section so as to absorb a lateral collision force, and
   the reinforcement is disposed at a position at which the reinforcement overlaps with the closed spaces of the right and left vehicle rockers in a vehicle-height direction.

2. The battery unit mounting structure according to claim 1, wherein the reinforcement is fixed to the battery unit at or near a center of the battery unit in the vehicle front-rear direction.

3. The battery unit mounting structure according to claim 1, further comprising a pair of right and left gussets, each of the gussets having an inner end portion in the vehicle-width direction connected to a corresponding one of outer end portions of the reinforcement in the vehicle-width direction, and each of the gussets having an outer end portion in the vehicle-width direction connected to a corresponding one of the right and left side members.

4. The battery unit mounting structure according to claim 1, wherein the reinforcement is a rod.

5. The battery unit mounting structure according to claim 1, wherein each of the right and left side members is hollow so as to absorb the lateral collision force.

6. The battery unit mounting structure according to claim 1, further comprising a floor panel attached between inner sides of the right and left side members in the vehicle-width direction, the floor panel including a recess into which the battery unit and the reinforcement are disposed, left and right side surfaces of the battery unit in the vehicle-width direction being spaced from left and right side surfaces of the recess in the vehicle-width direction.

7. A battery unit mounting structure comprising:
   a pair of right and left vehicle rockers extending in a vehicle front-rear direction, the right and left vehicle rockers being disposed respectively at right and left outer side portions of a vehicle body in a vehicle-width direction;
   a battery unit disposed between the right and left vehicle rockers; and
   a reinforcement disposed on a bottom surface or a top surface of the battery unit, the reinforcement being disposed at a position at which the reinforcement overlaps with the battery unit in a plan view, and the reinforcement having a width in the vehicle-width direction that is longer than a width of the battery unit in the vehicle-width direction, wherein each of the right and left vehicle rockers is hollow and forms a closed space when viewed in cross-section so as to absorb a lateral collision force, and the reinforcement is disposed at a position at which the reinforcement overlaps with the closed spaces of the right and left vehicle rockers in a vehicle-height direction.

8. The battery unit mounting structure according to claim 7, wherein the reinforcement is fixed to the battery unit at or near a center of the battery unit in the vehicle front-rear direction.

9. The battery unit mounting structure according to claim 7, further comprising a pair of right and left gussets, each of the gussets having an inner end portion in the vehicle-width direction connected to a corresponding one of outer end portions of the reinforcement in the vehicle-width direction, and each of the gussets having an outer end portion in the vehicle-width direction connected to a corresponding one of the right and left vehicle rockers.

10. The battery unit mounting structure according to claim 7, wherein the reinforcement is a rod.

11. The battery unit mounting structure according to claim 7, further comprising a floor panel attached between inner sides of the right and left vehicle rockers in the vehicle-width direction, the floor panel including a recess into which the battery unit and the reinforcement are disposed, left and right side surfaces of the battery unit in the vehicle-width direction being spaced from left and right side surfaces of the recess in the vehicle-width direction.

* * * * *